(12) United States Patent
Wu

(10) Patent No.: US 12,353,491 B2
(45) Date of Patent: Jul. 8, 2025

(54) SEARCH RESULT PRESENTATION METHOD AND APPARATUS, AND COMPUTER DEVICE AND STORAGE MEDIUM

(71) Applicant: Beijing Zitiao Network Technology Co., Ltd., Beijing (CN)

(72) Inventor: Yiwen Wu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/570,608

(22) PCT Filed: Oct. 14, 2022

(86) PCT No.: PCT/CN2022/125281
§ 371 (c)(1),
(2) Date: Dec. 14, 2023

(87) PCT Pub. No.: WO2023/109291
PCT Pub. Date: Jun. 22, 2023

(65) Prior Publication Data
US 2024/0289401 A1    Aug. 29, 2024

(30) Foreign Application Priority Data
Dec. 14, 2021    (CN) .......................... 202111526381.3

(51) Int. Cl.
*G06F 16/9538*    (2019.01)
*G06F 16/435*    (2019.01)
*G06F 16/9535*    (2019.01)

(52) U.S. Cl.
CPC ........ *G06F 16/9538* (2019.01); *G06F 16/435* (2019.01); *G06F 16/9535* (2019.01)

(58) Field of Classification Search
CPC ........ G06F 16/43; G06F 16/435; G06F 16/48; G06F 16/483; G06F 16/9535; G06F 16/9538
See application file for complete search history.

(56) References Cited

U.S. PATENT DOCUMENTS

2012/0296739 A1* 11/2012 Cassidy ............. G06Q 30/0277
705/14.51
2013/0212178 A1* 8/2013 Krishnamurthy ....... H04L 67/02
709/204

(Continued)

FOREIGN PATENT DOCUMENTS

CN    103473273 A    12/2013
CN    104391871 A    3/2015

(Continued)

OTHER PUBLICATIONS

International Patent Application No. PCT/CN2022/125281; Int'l Search Report; dated Dec. 15, 2022; 3 pages.

*Primary Examiner* — James E Richardson
(74) *Attorney, Agent, or Firm* — BakerHostetler

(57) ABSTRACT

The present disclosure provides a search result presentation method and apparatus, a computer device, a computer-readable storage medium, a program product, and a program. The method comprises: receiving search information with a commodity description field being marked in the search information; acquiring a plurality of search results matching the commodity description field, wherein each search result comprises commodity information, and a plurality of pieces of multimedia content matching a commodity indicated by the commodity information; and presenting the search results in different regions in a search result page.

18 Claims, 5 Drawing Sheets

(56) References Cited

U.S. PATENT DOCUMENTS

| | | | | |
|---|---|---|---|---|
| 2013/0339190 A1* | 12/2013 | Yu | .................. | G06Q 30/0633 |
| | | | | 705/26.62 |
| 2017/0140006 A1* | 5/2017 | Yang | .................. | G06F 16/2228 |
| 2019/0268650 A1* | 8/2019 | Avedissian | ............ | G06F 3/0481 |
| 2022/0382808 A1* | 12/2022 | Li | .................. | G06V 10/7715 |
| 2023/0140681 A1* | 5/2023 | Wu | .................. | G06F 16/483 |
| | | | | 707/706 |
| 2024/0045898 A1* | 2/2024 | Zhu | .................. | G06Q 30/0631 |

FOREIGN PATENT DOCUMENTS

| | | | |
|---|---|---|---|
| CN | 104991936 A | 10/2015 | |
| CN | 110717801 A | 1/2020 | |
| CN | 111259225 A | 6/2020 | |
| CN | 112199524 A | 1/2021 | |
| CN | 113010767 A | 6/2021 | |
| CN | 113420242 A | 9/2021 | |
| CN | 113486252 A | 10/2021 | |
| CN | 113505301 A | 10/2021 | |
| CN | 114168865 A | 3/2022 | |
| CN | 114936896 A | 8/2022 | |
| WO | WO-0211067 A1 * | 2/2002 | ............ G06F 16/54 |
| WO | WO 2021/238667 A1 | 12/2021 | |

* cited by examiner

SEARCH RESULT PRESENTATION METHOD AND APPARATUS, AND COMPUTER DEVICE AND STORAGE MEDIUM

CROSS-REFERENCE TO RELATED APPLICATION(S)

This application is a U.S. National Stage Application of PCT Application Serial No. PCT/CN2022/125281, filed Oct. 14, 2022, which claims priority to Chinese Application No. 202111526381.3, filed on Dec. 14, 2021, and entitled "Search Result Presentation Method and Apparatus, and Computer Device and Storage Medium", the disclosures of which are incorporated herein by reference in their entities.

FIELD

The present disclosure relates to the technical field of the Internet, and in particular, to a search result presentation method and apparatus, a computer device, a computer-readable storage medium, a program product, and a program.

BACKGROUND

A user may search commodity information via a search page, and there may be a plurality of search results in a search result page in general. The plurality of search results may involve related information of different commodities. For example, some search results involve commodity link information of the commodities, some search results involve related information such as videos or live streaming of the commodities, and commodities associated with different search results may be related to each other or not.

If the user is interested in a related commodity in a certain search result among the plurality of search results mentioned above, the user needs to further initiate a search for the related information in the search result, so as to attempt to acquire a more accurate search result. This results in an overlong overall search path, cumbersome operation and lower search efficiency.

SUMMARY

Embodiments of the present disclosure at least provide a search result presentation method and apparatus, a computer device, a computer-readable storage medium, a program product, and a program.

In a first aspect, an embodiment of the present disclosure provides a method for search result presentation, comprising:
  receiving search information with a commodity description field being marked;
  acquiring a plurality of search results matching the commodity description field, wherein each search result comprises commodity information, and a plurality of pieces of multimedia content matching a commodity indicated by the commodity information; and
  presenting the search results in different regions in a search result page.

In an optional embodiment, presenting the search results in different regions in the search result page comprises:
  dividing a search result presentation region of the search result page into a first sub-region and a second sub-region, presenting the commodity information in the first sub-region, and presenting the plurality of pieces of multimedia content in the second sub-region.

In an optional embodiment, the method further comprises:
  in response to a first trigger operation acting on the first sub-region, presenting a purchase page corresponding to the commodity information; or,
  in response to a second trigger operation acting on any piece of multimedia content in the second sub-region, performing full-screen playback on each piece of multimedia content in the second sub-region sequentially from the any piece of multimedia content.

In an optional embodiment, presenting the plurality of pieces of multimedia content in the second sub-region comprises:
  presenting, in the second sub-region, the multimedia content describing the commodity in at least one description dimension, wherein the description dimension is determined based on a commodity type, and each description dimension corresponds to at least one piece of the multimedia content.

In an optional embodiment, presenting the plurality of pieces of multimedia content in the second sub-region comprises:
  in response to a sliding operation acting on the second sub-region, switching to presenting different pieces of multimedia content, and playing a target piece of multimedia content located at a target presentation position in the second sub-region, wherein the target piece of multimedia content is a video or a piece of live streaming content.

In an optional embodiment, presenting the search results in different regions in the search result page comprises:
  upon a determination that there are a plurality of commodity dimensions matching the commodity description field:
  presenting, in the search result presentation region in the search result page, a dimension label of each commodity dimension among the plurality of commodity dimensions sequentially, and presenting, below the dimension label of each commodity dimension, the search results in the commodity dimension; or
  presenting, above the search result presentation region in the search result page, dimension labels of the plurality of commodity dimensions; and in response to a selection operation for a dimension label of a target commodity dimension among the plurality of commodity dimensions, presenting, in the search result presentation region, the search results in the target commodity dimension.

In an optional embodiment, the commodity information is matched with the plurality of pieces of multimedia content in each search result according to the following steps:
  parsing each piece of multimedia content to determine a commodity respectively associated with each piece of multimedia content; and
  according to the determined commodity respectively associated with each piece of multimedia content and the commodity respectively corresponding to each piece of commodity information, matching the commodity information with the pieces of multimedia content that correspond to the same commodity.

In an optional embodiment, determining the commodity respectively associated with each piece of multimedia content comprises:
  extracting commodity link information from the piece of multimedia content, and determining, based on the commodity link information, the commodity associated with the piece of multimedia content;

acquiring comment content of the piece of multimedia content, and extracting, from the comment content, the commodity associated with the piece of multimedia content;

performing semantic recognition on the piece of multimedia content, and determining, based on a semantic recognition result, the commodity associated with the piece of multimedia content; and initiating a commodity search request by using a key frame in the piece of multimedia content as search information, and using a commodity indicated by an obtained search result as the commodity associated with the piece of multimedia content.

In a second aspect, an embodiment of the present disclosure provides an apparatus for search result presentation, comprising:

an information receiving module, configured to receive search information with a commodity description field being marked;

a result acquisition module, configured to acquire a plurality of search results matching the commodity description field, wherein each search result comprises commodity information, and a plurality of pieces of multimedia content matching a commodity indicated by the commodity information; and a first presentation module, configured to present the search results in different regions in a search result page.

In an optional embodiment, the first presentation module is configured to divide a search result presentation region of the search result page into a first sub-region and a second sub-region, present the commodity information in the first sub-region, and present the plurality of pieces of multimedia content in the second sub-region.

In an optional embodiment, the apparatus further comprises a second presentation module;

the second presentation module is configured to: in response to a first trigger operation acting on the first sub-region, present a purchase page corresponding to the commodity information; or, in response to a second trigger operation acting on any piece of multimedia content in the second sub-region, perform full-screen playback on each piece of multimedia content in the second sub-region sequentially from the any piece of multimedia content.

In an optional embodiment, the first presentation module is configured to present, in the second sub-region, the multimedia content describing the commodity in at least one description dimension, wherein the description dimension is determined based on a commodity type, and each description dimension corresponds to at least one piece of the multimedia content.

In an optional embodiment, the first presentation module is configured to: in response to a sliding operation acting on the second sub-region, switch to presenting different pieces of multimedia content, and play a target piece of multimedia content located at a target presentation position in the second sub-region, wherein the target piece of multimedia content is a video or a piece of live streaming content.

In an optional embodiment, upon a determination that there are a plurality of commodity dimensions matching the commodity description field, the first presentation module is configured to sequentially present, in the search result presentation region in the search result page, a dimension label of each commodity dimension among the plurality of commodity dimensions sequentially and present, below the dimension label of each commodity dimension, each search result in the commodity dimension; or present, above the search result presentation region in the search result page, dimension labels of the plurality of commodity dimensions; and in response to a selection operation for a dimension label of a target commodity dimension among the plurality of commodity dimensions, present, in the search result presentation region, the search results in the target commodity dimension.

In an optional embodiment, the apparatus further comprises a content matching module, configured to match the commodity information with the pieces of multimedia content in each search result according to the following steps:

parsing each piece of multimedia content to determine a commodity respectively associated with each piece of multimedia content; and according to the determined commodity respectively associated with each piece of multimedia content and the commodity respectively corresponding to each piece of commodity information, matching the commodity information with the pieces of multimedia content that correspond to the same commodity.

In an optional embodiment, the content matching module is configured to extract commodity link information from the piece of multimedia content, and determine, based on the commodity link information, the commodity associated with the piece of multimedia content;

acquire comment content of the piece of multimedia content, and extract, from the comment content, the commodity associated with the piece of multimedia content;

perform semantic recognition on the piece of multimedia content, and determine, based on a semantic recognition result, the commodity associated with the piece of multimedia content; and initiate a commodity search request by using a key frame in the piece of multimedia content as search information, and use a commodity indicated by an obtained search result as the commodity associated with the piece of multimedia content.

In a third aspect, an embodiment of the present disclosure further provides a computer device, comprising: a processor, a memory and a bus, wherein the memory stores machine-readable instructions executable by the processor, and when the computer device is running, the processor communicates with the memory by means of the bus, and when executed by the processor, the machine-readable instructions execute steps of the method for search result presentation in the first aspect or any possible designs in the first aspect.

In a fourth aspect, an embodiment of the present disclosure further provides a computer-readable storage medium, wherein a computer program is stored on the computer-readable storage medium, and when executed by a processor, the computer program performs steps of the method for search result presentation in the first aspect or any possible designs in the first aspect.

In fifth aspect, an embodiment of the present disclosure further provides a computer program product, comprising a computer program, wherein when executed by a processor, the computer program implements steps of the method for search result presentation in the first aspect or any possible designs in the first aspect.

In a sixth aspect, an embodiment of the present disclosure further provides a computer program, wherein when executed by a processor, the computer program implements steps of the method for search result presentation in the first aspect or any possible designs in the first aspect.

With regard to description of effects the apparatus for search result presentation, the computer device and the computer-readable storage medium, reference may be made to the description of the above method for search result presentation, and thus details are not described herein again.

According to the idea of synchronously presenting the found commodity information and the plurality of pieces of multimedia content matching the commodity indicated by the commodity information in the embodiments of the present disclosure, while acquiring the commodity information by search, the user can learn about detailed information of the commodity conveniently and synchronously based on the synchronously presented plurality of pieces of multimedia content. Thus the search operation is simplified and the search efficiency and the user experience is improved.

In order to make the above objectives, features and advantages of the present disclosure more comprehensible, preferred embodiments are described in detail below in combination with the drawings.

BRIEF DESCRIPTION OF THE DRAWINGS

To illustrate technical solutions in the embodiments of the present disclosure more clearly, a brief introduction on the drawings which are needed in the description of the embodiments is given below, the drawings herein are incorporated in and constitute a part of the present specification, and these drawings illustrate embodiments conforming to the present disclosure, and together with the specification, serve to explain the technical solutions of the present disclosure. It should be understood that the following drawings illustrate only some embodiments of the present disclosure, and therefore should not be considered as a limitation to the scope. Those ordinary skilled in the art may also obtain other related drawings according to these drawings without any inventive effort.

DETAILED DESCRIPTION OF EMBODIMENTS

Figure 1:
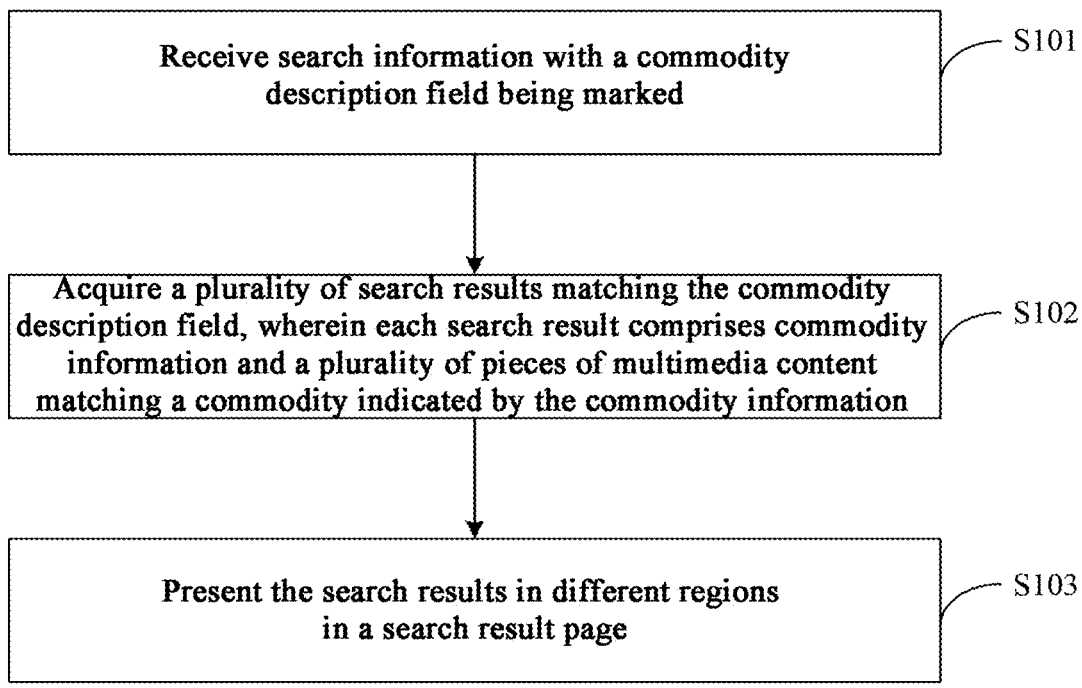
FIG. 1 is a flowchart of a method for search result presentation provided in embodiments of the present disclosure.

In order to make the objectives, technical solutions and advantages of the embodiments of the present disclosure clearer, a clear and complete description of the technical solutions in the embodiments of the present disclosure will be given below, in combination with the drawings in the embodiments of the present disclosure. Apparently, the embodiments described below are merely a part, but not all, of the embodiments of the present disclosure. Components of the embodiments of the present disclosure generally described and illustrated herein may be arranged and designed in a variety of different configurations. Therefore, the following detailed description of the embodiments of the present disclosure is not intended to limit the scope of the present disclosure as claimed, but merely represents a selected embodiment of the present disclosure. All of other embodiments, obtained by those skilled in the art based on the embodiments of the present disclosure without any creative effort, fall into the protection scope of the present disclosure.

Studies find that, when a user performs a search via a search page, various categories of commodities exist in the search result, but only a single piece of content is presented for each category. If the user finds a commodity of interest, the user cannot learn about comprehensive commodity information via a single video or a piece of live streaming content. The user needs to perform a further comprehensive search for the commodity of interest, and this results in a problem of an excessively long search path, tedious operations, low search efficiency and the like.

Considering that a complex result of the above comprehensive search cannot comprise relatively comprehensive commodity information of a same commodity, embodiments of the disclosure provides a method for search result presentation, comprising: acquiring, by means of a commodity description field in search information input by a user, search results matching the commodity description field; and integrating and presenting, in each search result, found commodity information and a plurality of pieces of multimedia content matching a commodity indicated by the commodity information. In one search result, with the presented commodity information, the user can acquire information such as a commodity link of the related commodity, and the user can further learn about the related commodity intuitively by means of the plurality of pieces of multimedia content associated therewith. As such, the user can decide whether he/she is interested in the associated commodity information conveniently and rapidly. Therefore, by means of associating the commodity information and various pieces of multimedia content that correspond to the same commodity, which are traditionally presented in different search results respectively, and presenting them in a single search result, an overall search path for the user can be shortened and thereby improving the search efficiency.

It should be noted that similar reference signs and letters represent similar items in the following figures. Therefore, once a certain item is defined in one figure, there is no need to further define and interpret it in the subsequent figures.

In order to facilitate the understanding of the present embodiment, firstly, a method for search result presentation disclosed in the embodiment of the present disclosure is described in detail, and an execution body of the method for search result presentation provided in the embodiment of the present disclosure is generally a computer device having a certain computing capability. In some possible embodiments, the method for search result presentation may be implemented by invoking, by means of a processor, a computer-readable instruction stored in a memory.

The method for search result presentation in the embodiments of the present disclosure is described in detail below.

As shown in FIG. 1, it is a flowchart of a method for search result presentation provided in embodiments of the present disclosure. The method for search result presentation in the embodiments of the present disclosure may be applied in a scenario of a comprehensive search, and mainly comprises the following steps S101 to S103:

S101: receiving search information with a commodity description field being marked.

In the present step, the search information may comprise information, which is input by a user in an information website or an application (APP) page that provides various information, and is used for requesting to acquire content related to a commodity. The search information may comprise word information, or statement information, etc. The commodity description field for the commodity, such as a keyword for the commodity, is identified in the search information. Exemplarily, the search information is "the most popular winter long down jacket this year", and the keyword may comprise "this year", "popular", "winter", "long down jacket" and the like. Therefore, the commodity description field may indicate the corresponding commodity, for example, a hot-selling long down jacket this winter.

Here, a search terminal, that is, an information website or an application (APP) that provides various information, comprises, but is not limited to: a webpage terminal of a target website, an application client, and the like.

S102: acquiring a plurality of search results matching the commodity description field, wherein each search result comprises commodity information and a plurality of pieces of multimedia content matching a commodity indicated by the commodity information.

In the present step, the commodity information may comprise content matching the commodity in the commodity description field. For example, the commodity information may comprise a commodity picture, commodity description information, a commodity price, a purchase link, or the like. The multimedia content matching the commodity may comprise live streaming content, video content, or image content of the matched commodity and the like. Here, one piece of commodity information may correspond to a plurality of pieces of matched multimedia content, and the plurality of pieces of multimedia content may comprise more comprehensive information of the commodity matching therewith.

After the search information is received, a plurality of search results matching the commodity description field are acquired. The commodity information and the plurality of pieces of multimedia content, which are associated in advance and are matched with the commodity indicated by the commodity description field, may be acquired directly based on the commodity description field. Alternatively, the commodity information matching the commodity indicated by the commodity description field, and the plurality of pieces of multimedia content may also be searched in real time in the terminal based on the commodity description field. After the commodity association is performed in real time, the associated commodity information and the plurality of pieces of multimedia content are presented as one search result. In summary, in the embodiments of the present disclosure, the commodity information and the pieces of multimedia content, which are traditionally presented in respective search results, are associated with the same commodity so as to be presented in one search result.

The commodity information may be matched with the multimedia content in each search result according to the following steps:

S102-1: parsing each piece of multimedia content to determine a commodity respectively associated with each piece of multimedia content.

Here, respective pieces of multimedia content may comprise all pieces of the multimedia content in the terminal. The pieces of the multimedia content comprise, but is not limited to, a video or an image uploaded by a commodity presentation user such as a buyer or a seller, as well as real-time updated live streaming, etc.

For each piece of multimedia content, by means of parsing the piece of multimedia content, a commodity indicated by a parsing result may be acquire. The commodity is associated with the piece of multimedia content, that is, the commodity matching the piece of multimedia content is determined. Then the commodity information matching the piece of multimedia content is determined. For each piece of multimedia content, a commodity may be matched with it in the association way as discussed above.

The above way of parsing the piece of multimedia content comprises, but is not limited to, extracting commodity link information from the piece of multimedia content, acquiring comment content from the piece of multimedia content, performing semantic recognition on the piece of multimedia content, extracting a key frame in the piece of multimedia content, and determining the search result of the key frame, etc.

Specific illustrations of determining the commodity respectively associated with each piece of multimedia content are as follows:

Manner 1: extracting commodity link information from the piece of multimedia content, and determining, based on the commodity link information, the commodity associated with the piece of multimedia content.

Here, a commodity link may be extracted from the piece of multimedia content, and the commodity link information is identified, wherein the commodity link information comprises information of a commodity indicated by the commodity link. Then the commodity indicated by the commodity link information may be used directly as the commodity associated with the piece of multimedia content.

The piece of multimedia content may comprise image content, and may further comprise dynamic playback content and statically presented content (e.g., an external plugin, the external plugin does not change along with a change in the actual multimedia playback content, and the external plugin presents a commodity link) in live streaming and a video.

Manner 2: acquiring comment content of the piece of multimedia content, and extracting, from the comment content, the commodity associated with the piece of multimedia content.

Here, acquiring the comment content of the piece of multimedia content may comprise: extracting a key statement or keyword from the comment content, determining a commodity indicated by the keyword or the key statement, and then using the commodity indicated by the keyword or the key statement as the commodity associated with the piece of multimedia content.

Manner 3: performing semantic recognition on the piece of multimedia content, and determining, based on a result of the semantic recognition, the commodity associated with the piece of multimedia content.

Here, semantic recognition may be performed on the piece of multimedia content by using a semantic recognition algorithm. For example, the semantic recognition is performed on an image and the sound by using an intelligent video content semantic extraction algorithm, so as to determine the semantic recognition result. The semantic recognition result may indicate a recognized commodity, and then the recognized commodity may be used as the commodity associated with the piece of multimedia content.

Manner 4: initiating a commodity search request by using a key frame in the piece of multimedia content as search information, and using a commodity indicated by an obtained search result as the commodity associated with the piece of multimedia content.

Here, the key frame may be extracted from the piece of multimedia content, and the key frame is used as the search information. The commodity search request may be initiated automatically to acquire a search result corresponding to the search information, wherein the found search result may indicate one or more commodities. If the found search result indicates one commodity, the commodity may be used as the commodity associated with the piece of multimedia content. If the found search result indicates a plurality of commodities, the plurality of commodities may also be respectively used as commodities associated with the piece of multimedia content. That is, one piece of multimedia content is associated with a plurality of commodities.

Here, the key frame comprises information related to the commodity and obviously indicates the commodity, but does not comprise description information of the commodity. For example, the key frame is a certain star, and the commodity search result corresponding thereto may be a hot-selling commodity that the star recently endorsed, but the key frame itself does not contain the information of the commodity.

S102-2: according to the determined commodity respectively associated with each piece of multimedia content and the commodity respectively corresponding to each piece of commodity information, matching the commodity information and the pieces of multimedia content that correspond to the same commodity.

Here, the commodity information itself contains specific description information of the commodity, such as a name of the commodity, the commodity link, and the like. Therefore, the commodity information is information directly describing the commodity. In a case where the commodity respectively associated with each piece of multimedia content is determined, it is possible to match the commodity information with the pieces of multimedia content that correspond to the same commodity directly.

A plurality of pieces of commodity information corresponding to the same commodity may be determined according to the commodity indicated by the commodity description field. Then, in one case, based on the above S102-1 and S102-2, a matching relationship between the commodity information and the pieces of multimedia content is pre-stored, and then a plurality of search results matching the commodity description field may be acquired directly using the matching relationship between the commodity information and the pieces of multimedia content, which is pre-stored in the terminal. In another case, the pieces of multimedia content matching each piece of commodity information may also be determined based on the plurality of pieces of commodity information according to S102-1 and S102-2.

Exemplarily, if it is determined that the commodity is a hot-selling long down jacket this winter, the plurality of pieces of commodity information may comprise hot-selling long down jackets this winter of a plurality of brands. The plurality of pieces of multimedia content matching the commodity information may comprise video content of a long down jacket of a corresponding brand.

S103: presenting the search results in different regions in a search result page.

Here, the search result page comprises a search result presentation region, and the search results may be presented in different regions in the search result presentation region.

In some embodiments, the search result presentation region of the search result page may be divided into a first sub-region and a second sub-region, the commodity information is presented in the first sub-region, and the plurality of pieces of multimedia content are presented in the second sub-region.

The commodity information presented in the first sub-region may be presented in a form comprising but not limited to, a form of a commodity card. The pieces of multimedia content presented in the second sub-region may be presented in a form comprising but not limited to, a form of a video presentation window, and the plurality of pieces of multimedia content are simultaneously presented in the second sub-region.

Figure 2:
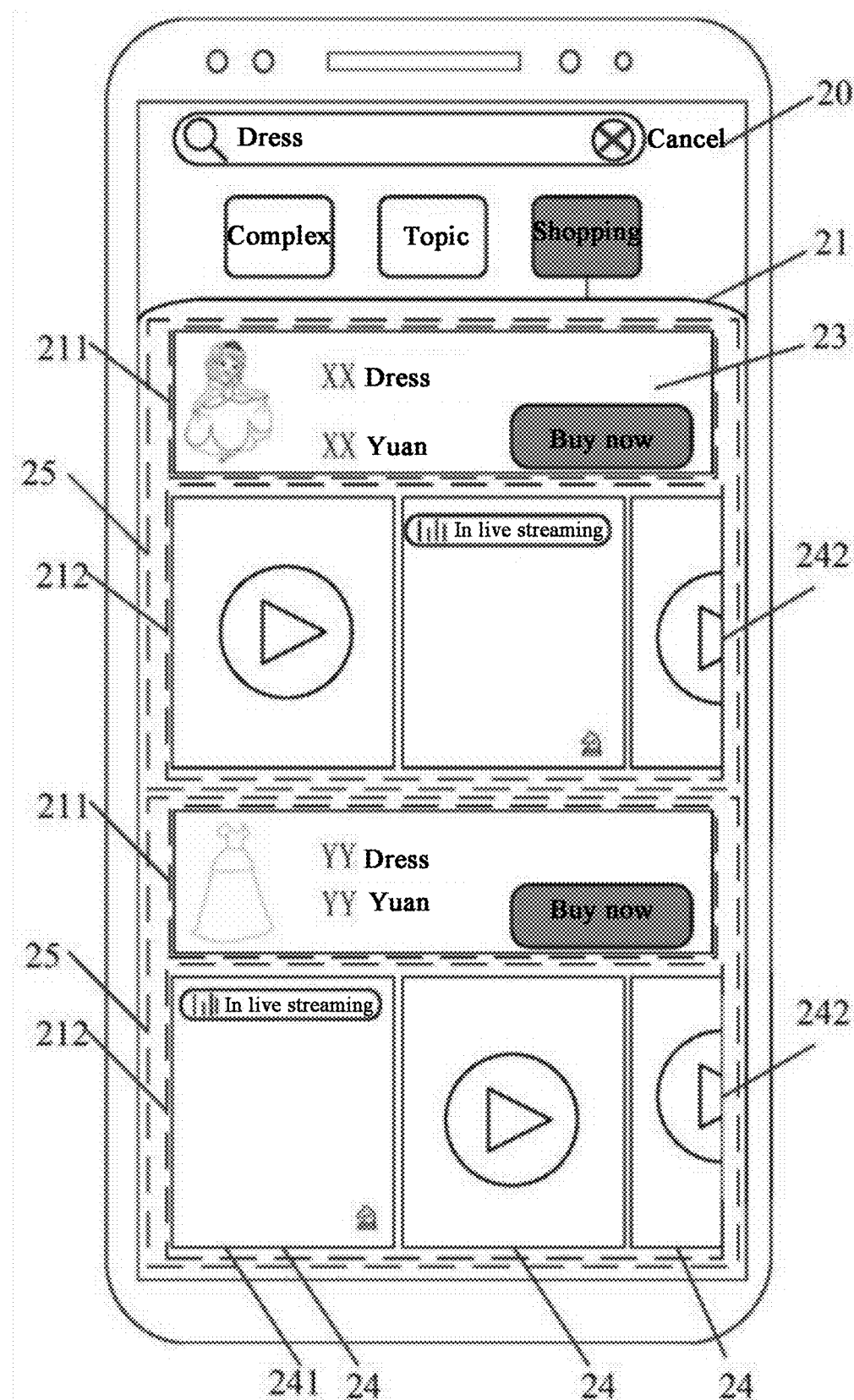
FIG. 2 is a schematic diagram of presenting a plurality of search results in different regions in a search result page provided in embodiments of the present disclosure.

Here, each first sub-region has a second sub-region corresponding thereto. The presentation positions of the first sub-region and the second sub-region corresponding to the first sub-region may comprise: firstly presenting the first sub-region in the search result presentation region, and presenting the corresponding second sub-region at a lower position adjacent to the first sub-region. Referring to FIG. 2, it is a schematic diagram of presenting the search results in different regions in the search result page. A search result page 20 and a search result presentation region 21 are comprised, and the search result presentation region 21 comprises a plurality of first sub-regions 211 and a plurality of second sub-regions 212. Commodity information 23 (such as a commodity picture, commodity description information, a commodity price, a purchase link and the like) is presented in each first sub-region 211, and each second sub-region 212 presents a plurality of pieces of multimedia content 24 (such as video content, a piece of live streaming content, etc.). A plurality of search results 25 are presented in the search result presentation region 21.

When the commodity information is presented in the first sub-region, a plurality of pieces of multimedia contents matching the commodity indicated by the commodity information are presented together in the second sub-region corresponding to the first sub-region, so that the user can learn about related information of the commodity conveniently and comprehensively.

For example, the first sub-region presents content such as the commodity picture, the commodity description information, the commodity price, the purchase link, and the like. The second sub-region corresponding to the first sub-region presents content such as a video, a piece of live streaming content or a picture of the commodity, for example, live streaming content of the seller, or a commodity presentation video uploaded by the buyer, etc.

In some embodiments, the first sub-region and the second sub-region may also respectively support skipping to another page. In a specific embodiment, a purchase page corresponding to the commodity information may be presented in response to a first trigger operation acting on the first sub-region.

In response to a trigger operation acting on a purchase control in the commodity information presented in the first sub-region, a purchase page skipping under the purchase control may be presented. Compared with the commodity information presented in the first sub-region, the commodity information presented in the purchase page is more comprehensive. Here, the purchase control in the commodity information may be any preset control, and the purchase control corresponds to the purchase link of the commodity.

Alternatively, in response to a second trigger operation acting on any piece of multimedia content in the second sub-region, full-screen playback is performed on each piece of multimedia content in the second sub-region sequentially from the any piece of multimedia content.

The plurality of pieces of multimedia content may be presented in the second sub-region side by side. In response to the second trigger operation acting on the any piece of multimedia content in the second sub-region, the any piece of multimedia content is correspondingly played in full screen. After the any piece of multimedia content is played, the next piece of multimedia content after the any piece of multimedia content, which is presented side by side, is played in full screen until each piece of multimedia content is played. Alternatively, circular playback is performed until it is triggered to stop. For example, the pieces of multimedia content are pieces of video content, after the second sub-region is triggered, respective pieces of multimedia content may be circularly played in a video in-stream page.

Here, respective pieces of multimedia content in the second sub-region may comprise the multimedia content that is currently presented in the search page, and the multimedia content that is not presented in the search page yet.

The first trigger operation and the second trigger operation comprise, but are not limited to, a plurality of operation modes such as a click operation or a sliding operation.

In order to reduce the decision difficulty of the user for the commodity, when content presentation is performed in the second sub-region, specifically, the multimedia content describing the commodity in at least one description dimension may be presented in the second sub-region.

Here, the description dimension may be determined based on a commodity type, and each description dimension corresponds to at least one piece of multimedia content.

For example, when it is determined that the commodity type is of a clothing category, it is determined that the description dimension may comprise, but is not limited to, clothing colors, materials (e.g., cotton materials, artificial fibers, and the like), styles (e.g., short, long, medium long, and the like), sizes (large, medium and small), and the like. When it is determined that the commodity type is of a cosmetic category, it is determined that the description dimension comprises, but is not limited to, uses, effects, applicable crowds of the cosmetic and the like. When it is determined that the commodity type is of an electronic product category, it is determined that the description dimension may comprise, but is not limited to, designs, functions, effects, and the like.

Here, the user may adaptively select to view the multimedia content in a target description dimension according to the description dimensions. Generally, the content describing the commodity in the target description dimension is information of the commodity, which is mainly concerned by the user. Therefore, with the multimedia content describing the commodity in the description dimensions, the user can perform a commodity decision quickly. For example, the user can decide to purchase an electronic product after learning about main functions of the electronic product.

For one piece of commodity information, a plurality of pieces of multimedia content are often matched. In order to save the presentation space of the second sub-region, a plurality of pieces of multimedia content may be transversely presented in the second sub-region, wherein the plurality of pieces of multimedia content comprises the piece of multimedia content being presented in the page and the piece of multimedia content being shielded. The shielded piece of multimedia content may be displayed and presented via a sliding operation.

In a specific embodiment, in response to a sliding operation acting on the second sub-region, different pieces of multimedia content are switched for presenting, and a target piece of multimedia content located at a target presentation position in the second sub-region is played, wherein the target piece of multimedia content may be a video or a piece of live streaming content.

Referring to FIG. 2, the plurality of pieces of multimedia content 24 presented in the second sub-region comprise multimedia content 241 being completely presented, and multimedia content 242 being partially shielded and partially presented. In addition, further multimedia content being completely shielded from the second sub-region is also comprised. In response to the sliding operation acting on the second sub-region, different pieces of multimedia content may be switched for presenting, and at this time, the partially shielded and partially presented multimedia content 242 and the completely shielded multimedia content are also presented in sequence.

Here, a target presentation position may also be set. For example, a position where a first video window corresponding to the second sub-region is located may be used as the target presentation position, which is the position where the multimedia content 241 in FIG. 2 is located. Alternatively, according to a region range of the second sub-region and a size of each video window, a region, at the middle of the second sub-region, with a size equal to the size of one video window is used as the target presentation position. With the sliding operation, the multimedia content located at the target presentation position is controlled to be played automatically.

For S103, the search results are presented in different regions in the search result page. In order to give a better understanding of the commodity dimensions of the commodity presented by each search result to the user, classification processing may be performed on each search result, and a dimension label of each commodity dimension is determined. With the dimension labels, the user can locate a required commodity quickly.

Here, each commodity may be preset with a corresponding commodity dimension and a dimension label of the commodity dimension. The commodity dimension corresponding to each commodity and the dimension label of the commodity dimension are stored in the terminal. After the commodity indicated by the commodity description field is determined, the commodity dimension corresponding to the commodity is acquired, and the dimension label of the commodity dimension is presented in the search page.

Upon a determination that there are a plurality of commodity dimensions matching the commodity description field, the search results may be presented in the search result presentation region according to the following several manners:

Manner 1: sequentially presenting, in the search result presentation region in the search result page, the dimension label of each commodity dimension among the plurality of commodity dimensions, and presenting, below the dimension label of each commodity dimension, respective search results in the commodity dimension.

Figure 3:
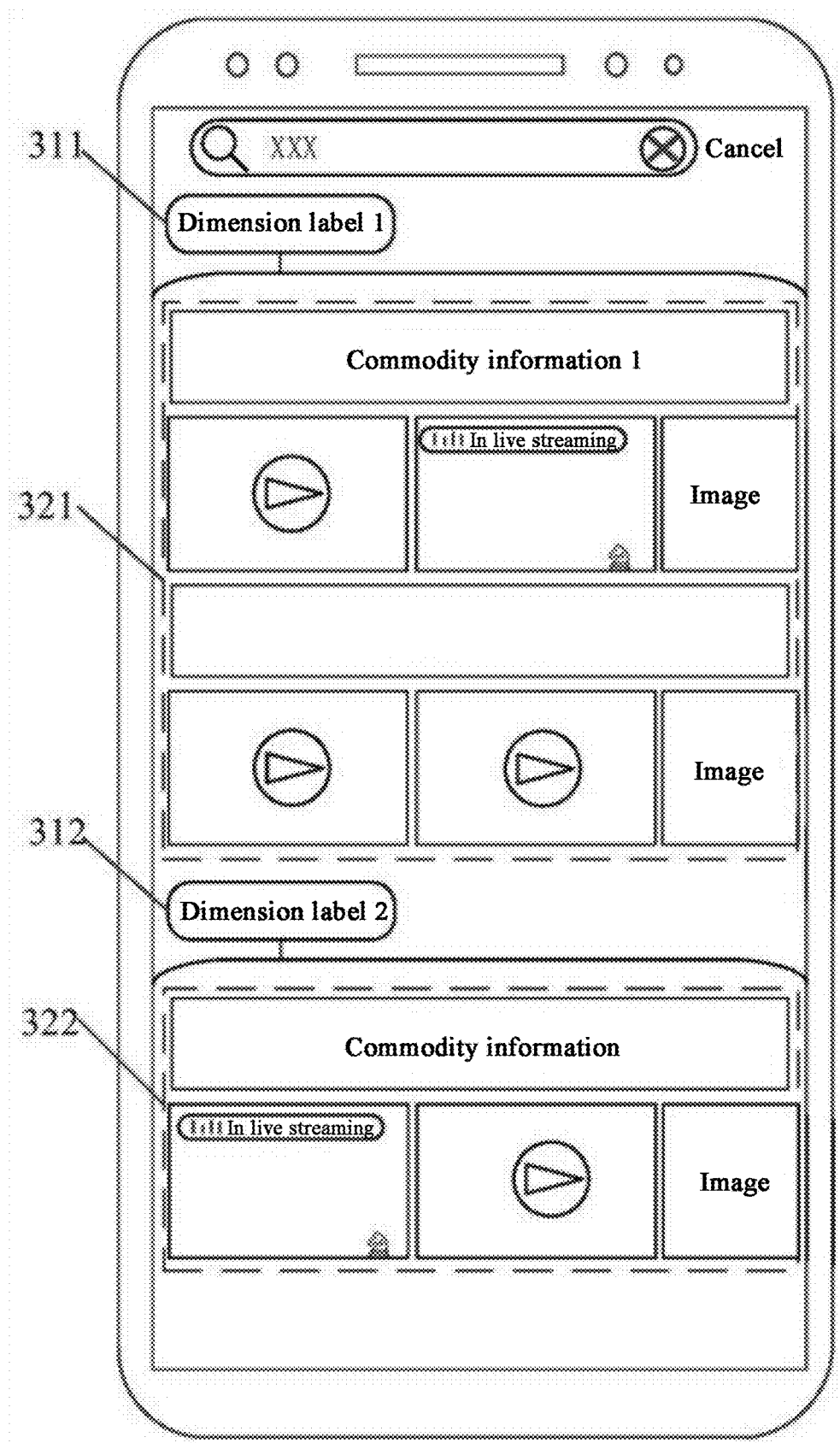
FIG. 3 is a schematic diagram of a search result presentation mode provided in embodiments of the present disclosure.

Reference may be made to FIG. 3, which is a schematic diagram of one search result presentation mode. Respective search results are presented in the search result presentation region, wherein two search results 321 are presented below the dimension label 311, and one search result 322 is presented below the dimension label 312.

Manner 2: presenting, above the search result presentation region in the search result page, dimension labels of the plurality of commodity dimensions; and in response to a selection operation for a dimension label of a target commodity dimension among the plurality of commodity dimensions, presenting, in the search result presentation region, respective search results below the target commodity dimension.

Figure 4:
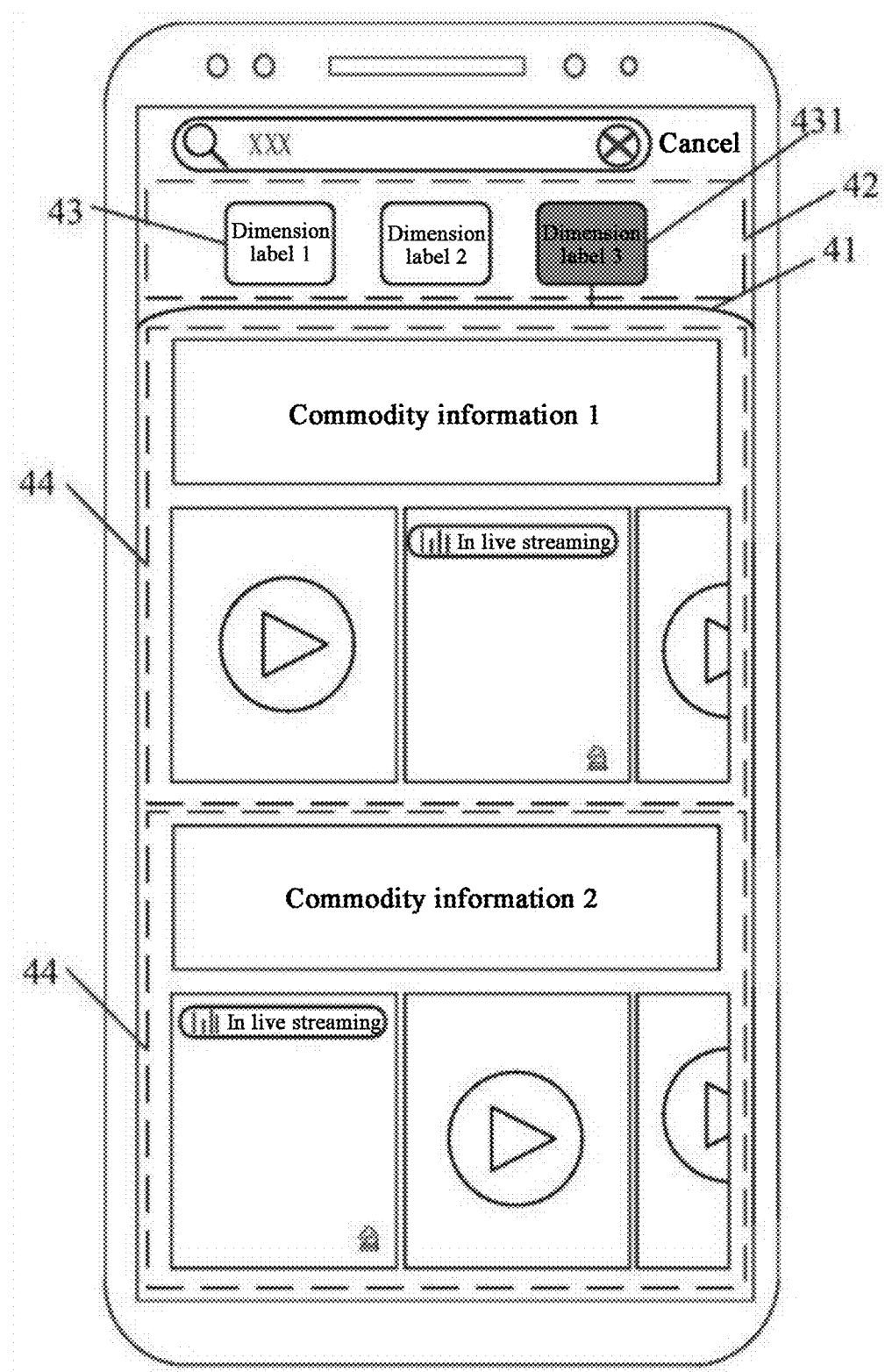
FIG. 4 is a schematic diagram of another search result presentation mode provided in embodiments of the present disclosure.

Reference may be made to FIG. 4, which is a schematic diagram of another search result presentation mode. Dimension labels 43 of the plurality of commodity dimensions are presented in a preset region 42 above a search result presentation region 41, and respective search results 44 are presented in the search result presentation region 41 below a target commodity dimension 431.

Exemplarily, the commodity dimension of a dress may comprise a brand, an applicable season (e.g., winter, spring, autumn and summer), a style (e.g., refresh, retro or the like). The commodity dimension of a lipstick may comprise a brand, a color number, and the like.

With S101 to S103, by means of the commodity description field in the search information input by the user, search results matching the commodity description field are acquired; and the found commodity information and the plurality of pieces of multimedia content matching the commodity indicated by the commodity information are integrated together, so as to be presented in each search result. In one search result, by means of the presented commodity information, the user can acquire information such as the commodity link of the related commodity, and the user can further understand the related commodity intuitively by means of the plurality of pieces of multimedia content associated therewith. As such, the user can decide whether he/she is interested in the associated commodity information, so as to perform a selection rapidly and conveniently. Therefore, by means of associating the commodity information and the pieces of multimedia content that correspond to the same commodity, which are traditionally presented in different search results respectively, and presenting the same in a single search result, the search path for the user can be shortened as a whole, and thus the search efficiency can be improved.

It will be understood by those skilled in the art that, in the above method of specific embodiments, the writing sequence of each step does not mean a strict execution sequence to constitute any limitation on the implementation process, and the specific execution sequence of each step should be determined by its function and possible internal logic.

Based on the same inventive concept, embodiments of the present disclosure further provides an apparatus for search result presentation corresponding to the method for search result presentation. Since the principles of the apparatus for solving problems in the embodiment of the present disclosure are similar to those of the search result presentation method in the embodiment of the present disclosure, the implementation of the apparatus may refer to the implementation of the method, and thus details are not described again.

Figure 5:
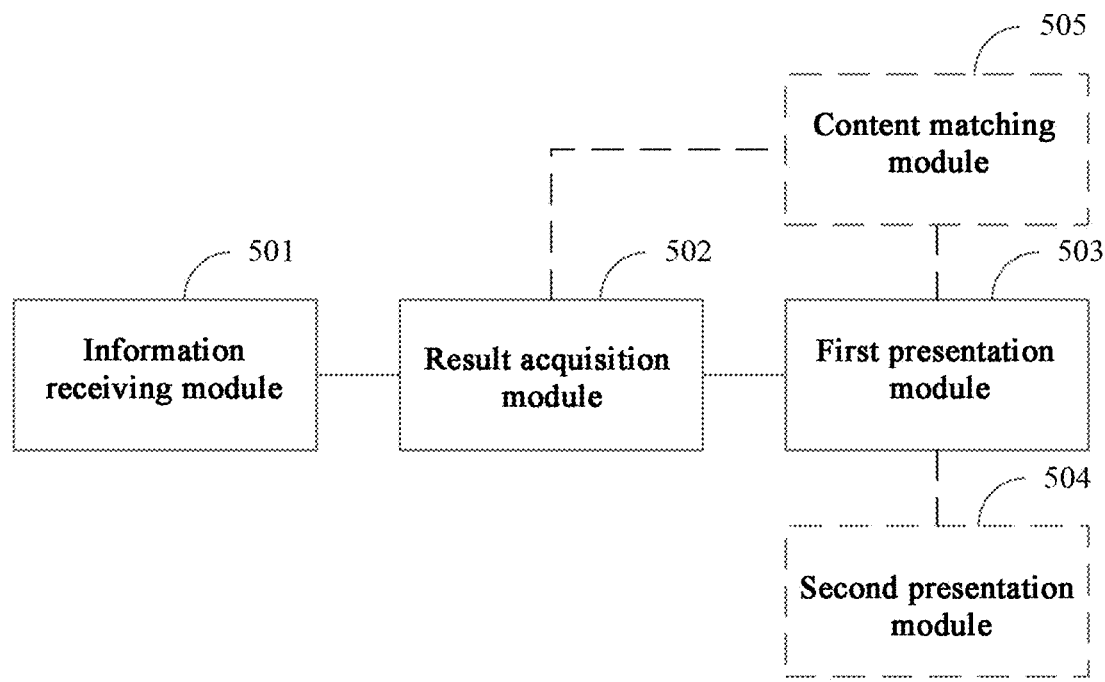
FIG. 5 is a schematic diagram of an apparatus for search result presentation provided in embodiments of the present disclosure.

As shown in FIG. 5, it is a schematic diagram of an apparatus for search result presentation provided in embodiments of the present disclosure, and the apparatus comprises: an information receiving module 501, a result acquisition module 502 and a first presentation module 503, wherein, the information receiving module 501 is configured to receive search information with a commodity description field being marked;

the result acquisition module 502 is configured to acquire a plurality of search results matching the commodity description field, wherein each search result comprises commodity information, and a plurality of pieces of multimedia content matching a commodity indicated by the commodity information; and the first presentation module 503 is configured to present the search results in different regions in a search result page.

In an optional embodiment, the first presentation module 503 is configured to divide a search result presentation region of the search result page into a first sub-region and a second sub-region, present the commodity information in the first sub-region, and present the plurality of pieces of multimedia content in the second sub-region.

In an optional embodiment, the apparatus further comprises a second presentation module 504;

the second presentation module 504 is configured to: in response to a first trigger operation acting on the first sub-region, present a purchase page corresponding to the commodity information; or in response to a second trigger operation acting on any piece of multimedia content in the second sub-region, perform full-screen playback on each piece of multimedia content in the second sub-region sequentially from the any piece of multimedia content.

In an optional embodiment, the first presentation module 503 is configured to present, in the second sub-region, the multimedia content describing the commodity in at least one description dimension, wherein the description dimension is determined based on a commodity type, and each description dimension corresponds to at least one piece of multimedia content.

In an optional embodiment, the first presentation module 503 is configured to: in response to a sliding operation acting on the second sub-region, switch to presenting different pieces of multimedia content, and play a target piece of multimedia content located at a target presentation position in the second sub-region, wherein the target piece of multimedia content is a video or a piece of live streaming content.

In an optional embodiment, upon a determination that there are a plurality of commodity dimensions matching the commodity description field, the first presentation module 503 is configured to sequentially present, in the search result presentation region in the search result page, a dimension label of each commodity dimension among the plurality of commodity dimensions, and present, below the dimension label of each commodity dimension, search results in the commodity dimension; or present, above the search result presentation region in the search result page, dimension labels of the plurality of commodity dimensions; and in response to a selection operation for a dimension label of a target commodity dimension among the plurality of commodity dimensions, present, in the search result presentation region, search results in the target commodity dimension.

In an optional embodiment, the apparatus further comprises a content matching module 505, configured to match the commodity information with the pieces of multimedia content in each search result according to the following steps:

parsing each piece of multimedia content to determine a commodity respectively associated with each piece of multimedia content; and according to the determined commodity respectively associated with each piece of multimedia content and the commodity respectively corresponding to each piece of commodity information, matching the commodity information with the pieces of multimedia content that correspond to the same commodity.

In an optional embodiment, the content matching module 505 is configured to extract commodity link information from the piece of multimedia content, and determine, based on the commodity link information, the commodity associated with the piece of multimedia content;
  acquire comment content of the piece of multimedia content, and extract, from the comment content, the commodity associated with the piece of multimedia content;
  perform semantic recognition on the piece of multimedia content, and determine, based on a semantic recognition result, the commodity associated with the piece of multimedia content; and
  initiate a commodity search request by using a key frame in the piece of multimedia content as search information, and use a commodity indicated by an obtained search result as the commodity associated with the piece of multimedia content.

With regard to the description of the processing flow of each module in the apparatus and the interaction process between the modules, reference may be made to the related description in the foregoing method embodiments, and thus details are not described in detail herein.

Figure 6:
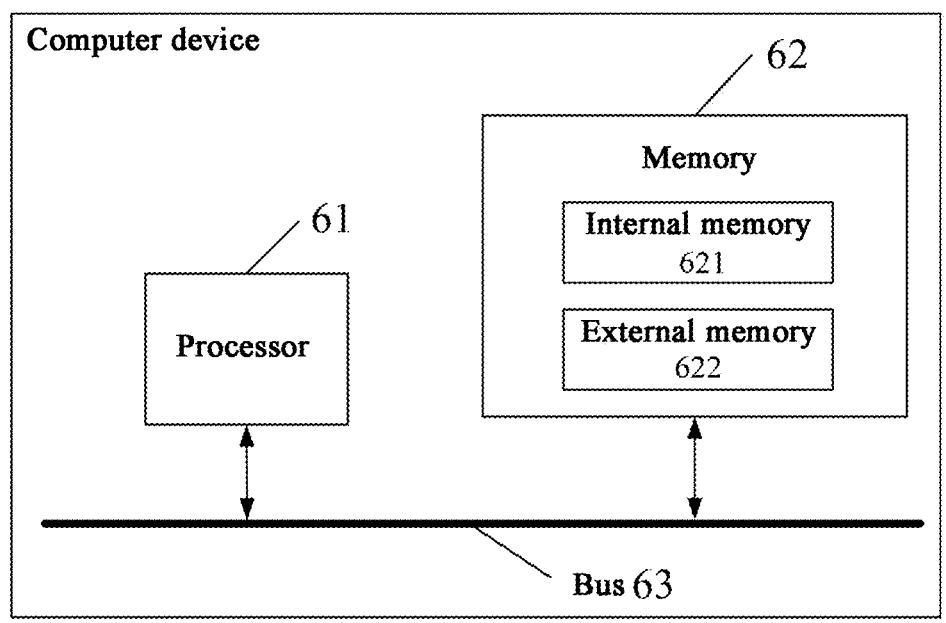
FIG. 6 is a schematic structural diagram of a computer device provided in embodiments of the present disclosure.

Based on the same technical concept, an embodiment of the present disclosure further provides a computer device. Referring to FIG. 6, it is a schematic structural diagram of a computer device provided in an embodiment of the present disclosure, wherein the computer device comprises:
  a processor 61, a memory 62 and a bus 63. The memory 62 stores a machine-readable instruction executable by the processor 61, the processor 61 is configured to execute the machine-readable instruction stored in the memory 62, and when the machine-readable instruction is executed by the processor 61, the processor 61 executes the following steps: S101: receiving search information with a commodity description field being marked; S102: acquiring a plurality of search results matching the commodity description field, wherein each search result comprises commodity information, and a plurality of pieces of multimedia content matching a commodity indicated by the commodity information; and S103: presenting the search results in different regions in a search result page.

The memory 62 comprises an internal memory 621 and an external memory 622; the internal memory 621 herein is also referred to as an internal storage, which is used for temporarily storing operation data in the processor 61 and data exchanged with the external memory 622 such as a hard disk. The processor 61 exchanges data with the external memory 622 through the internal memory 621, and when the computer device is running, the processor 61 communicates with the memory 62 via the bus 63, so that the processor 61 executes the execution instructions mentioned in the above embodiments of the method.

Embodiments of the present disclosure further provides a computer-readable storage medium, wherein a computer program is stored on the computer-readable storage medium, and when operated by a processor, the computer program executes the steps of the method for search result presentation in the first aspect or any possible designs in the first aspect. The storage medium may be a volatile or non-volatile computer-readable storage medium.

Embodiments of the present disclosure further provides a computer program product, wherein the computer program product carries a program code, instructions comprised in the program code may be used for executing the steps of the method for search result presentation in the above embodiments of the method, specific reference may be made to the above embodiments of the method, and thus details are not described herein again.

Embodiments of the present disclosure further provides a computer program, wherein when executed by a processor, the computer program implements the steps of the method for search result presentation in the above embodiments of the method.

The computer program product may be specifically implemented by hardware, software, or a combination thereof. In an optional embodiment, the computer program product is specifically embodied as a computer storage medium, and in another optional embodiment, the computer program product is specifically embodied as a software product, such as a software development kit (SDK), etc.

Those skilled in the art to which the present disclosure belongs can clearly understand that, for the convenience and brevity of description, with regard to the specific working process of the apparatus described above, reference may be made to the corresponding process in the foregoing method embodiments, and thus details are not described herein again. In the several embodiments provided in the present disclosure, it should be understood that, the disclosed apparatus and method may be implemented in other manners. The apparatus embodiments described above are merely exemplary, for example, the division of the units is only a logic function division, there may be other division manners in practical implementations, as another example, a plurality of units or components may be combined, or some features may be omitted or not implemented. From another point of view, the displayed or discussed mutual coupling or direct coupling or communication connection may be indirect coupling or communication connection of apparatuses or units through some communication interfaces, and may be in electrical, mechanical or other forms.

The units described as separate components may be separated physically or not, components displayed as units may be physical units or not, namely, may be located in one place, or may be distributed on a plurality of network units. A part of or all of the units may be selected to implement the purposes of the solutions in the present embodiment according to actual demands.

In addition, the functional units in various embodiments of the present disclosure may be integrated in a processing unit, or the units individually exist physically, or two or more units are integrated in one unit.

If a function is implemented in the form of a software functional unit and is sold or used as an independent product, it may be stored in a non-volatile computer-readable storage medium executable by a processor. Based on this understanding, the technical solutions of the present disclosure substantially, or the part contributing to the prior art, or some technical solutions may be implemented in the form of a software product, the computer software product is stored in a storage medium, and comprises several instructions for enabling a computer device (which may be a personnel computer, a server, or a network device or the like) to execute all or part of the steps of the method in various embodiments of the present disclosure. The foregoing storage medium comprises a variety of media capable of storing program codes, such as a USB disk, a mobile hard disk, a read-only memory (ROM), a random access memory (RAM), a magnetic disk, or an optical disk.

Finally, it should be noted that, the embodiments described above are merely specific implementations of the present disclosure, and are used to illustrate the technical solutions of the present disclosure instead of limiting the same. The protection scope of the present disclosure is not limited thereto, although the present disclosure has been described in detail with reference to the foregoing embodiments, those ordinary skilled in the art should understand that, any skilled familiar with this art may modify or easily conceive of changing the technical solutions recited in the foregoing embodiments, or equivalently replace some of the technical features therein; and these modifications, changes or substitutions do not make the nature of the corresponding technical solutions depart from the spirit and scope of the technical solutions of the embodiments of the present disclosure, and shall fall within the protection scope of the present disclosure. Therefore, the protection scope of the present disclosure shall be subject to the protection scope of the claims.

I claim:

1. A method for search result presentation, comprising:
receiving search information with a commodity description field being marked;
acquiring a plurality of search results matching the commodity description field, wherein each search result comprises commodity information and a plurality of pieces of multimedia content matching a commodity indicated by the commodity information, wherein matching each of the plurality of pieces of multimedia content with the commodity comprises:
extracting commodity link information from the piece of multimedia content, and determining, based on the commodity link information, the commodity associated with the piece of multimedia content,
acquiring comment content of the piece of multimedia content, and extracting, from the comment content, the commodity associated with the piece of multimedia content,
performing semantic recognition on the piece of multimedia content, and determining, based on a semantic recognition result, the commodity associated with the piece of multimedia content, and
initiating a commodity search request by using a key frame in the piece of multimedia content as search information, and identifying a commodity indicated by an obtained search result as the commodity associated with the piece of multimedia content; and
presenting the search results in different regions in a search result page.

2. The method according to claim 1, wherein presenting the search results in different regions in the search result page comprises:
dividing a search result presentation region of the search result page into a first sub-region and a second sub-region, presenting the commodity information in the first sub-region, and presenting the plurality of pieces of multimedia content in the second sub-region.

3. The method according to claim 2, wherein the method further comprises:
in response to a first trigger operation acting on the first sub-region, presenting a purchase page corresponding to the commodity information; or
in response to a second trigger operation acting on any piece of multimedia content in the second sub-region, performing full-screen playback on each piece of multimedia content in the second sub-region sequentially from the any piece of multimedia content.

4. The method according to claim 2, wherein presenting the plurality of pieces of multimedia content in the second sub-region comprises:
presenting, in the second sub-region, the multimedia content describing the commodity in at least one description dimension, wherein the description dimension is determined based on a commodity type, and each description dimension corresponds to at least one piece of the multimedia content.

5. The method according to claim 2, wherein presenting the plurality of pieces of multimedia content in the second sub-region comprises:
in response to a sliding operation acting on the second sub-region, switching to presenting different pieces of multimedia content, and playing a target piece of multimedia content located at a target presentation position in the second sub-region, wherein the target piece of multimedia content is a video or a piece of live streaming content.

6. The method according to claim 1, wherein presenting the search results in different regions in the search result page comprises:
upon a determination that there are a plurality of commodity dimensions matching the commodity description field:
presenting, in the search result presentation region in the search result page, a dimension label of each commodity dimension among the plurality of commodity dimensions sequentially, and presenting, below the dimension label of each commodity dimension, the search results in the commodity dimension; or
presenting, above the search result presentation region in the search result page, dimension labels of the plurality of commodity dimensions; and in response to a selection operation for a dimension label of a target commodity dimension among the plurality of commodity dimensions, presenting, in the search result presentation region, the search results in the target commodity dimension.

7. The method according to claim 1, wherein the commodity information is matched with the plurality of pieces of multimedia content in each search result according to the following steps:
parsing each piece of multimedia content to determine a commodity respectively associated with each piece of multimedia content; and
according to the determined commodity respectively associated with each piece of multimedia content and the commodity respectively corresponding to each piece of commodity information, matching the commodity information with the pieces of multimedia content that correspond to the same commodity.

8. A computer device, comprising: a processor and a memory, wherein the memory stores machine-readable instructions executable by the processor, the processor is configured to execute the machine-readable instructions stored in the memory, and when the machine-readable instructions, when executed by the processor, cause the processor to:
receive search information with a commodity description field being marked;
acquire a plurality of search results matching the commodity description field, wherein each search result comprises commodity information and a plurality of pieces of multimedia content matching a commodity indicated by the commodity information, wherein matching each of the plurality of pieces of multimedia content with the commodity comprises:
extracting commodity link information from the piece of multimedia content, and determining, based on the commodity link information, the commodity associated with the piece of multimedia content, acquiring comment content of the piece of multimedia content, and extracting, from the comment content, the commodity associated with the piece of multimedia content, performing semantic recognition on the piece of multimedia content, and determining, based on a semantic recognition result, the commodity associated with the piece of multimedia content, and initiating a commodity search request by using a key frame in the piece of multimedia content as search information, and identifying a commodity indicated by an obtained search result as the commodity associated with the piece of multimedia content; and present the search results in different regions in a search result page.

9. The computer device according to claim 8, wherein the computer device being caused to present the search results in different regions in the search result page comprises being caused to:

divide a search result presentation region of the search result page into a first sub-region and a second sub-region, present the commodity information in the first sub-region, and present the plurality of pieces of multimedia content in the second sub-region.

10. The computer device according to claim 9, wherein the computer device is further caused to:

in response to a first trigger operation acting on the first sub-region, present a purchase page corresponding to the commodity information; or in response to a second trigger operation acting on any piece of multimedia content in the second sub-region, perform full-screen playback on each piece of multimedia content in the second sub-region sequentially from the any piece of multimedia content.

11. The computer device according to claim 9, wherein the computer device being caused to present the plurality of pieces of multimedia content in the second sub-region comprises being caused to:

present, in the second sub-region, the multimedia content describing the commodity in at least one description dimension, wherein the description dimension is determined based on a commodity type, and each description dimension corresponds to at least one piece of the multimedia content.

12. The computer device according to claim 9, wherein the computer device being caused to present the plurality of pieces of multimedia content in the second sub-region comprises being caused to:

in response to a sliding operation acting on the second sub-region, switch to presenting different pieces of multimedia content, and play a target piece of multimedia content located at a target presentation position in the second sub-region, wherein the target piece of multimedia content is a video or a piece of live streaming content.

13. The computer device according to claim 9, wherein the computer device being caused to present the plurality of pieces of multimedia content in the second sub-region comprises being caused to:

upon a determination that there are a plurality of commodity dimensions matching the commodity description field:

present, in the search result presentation region in the search result page, a dimension label of each commodity dimension among the plurality of commodity dimensions sequentially, and present, below the dimension label of each commodity dimension, the search results in the commodity dimension; or present, above the search result presentation region in the search result page, dimension labels of the plurality of commodity dimensions; and in response to a selection operation for a dimension label of a target commodity dimension among the plurality of commodity dimensions, present, in the search result presentation region, the search results in the target commodity dimension.

14. The computer device according to claim 8, wherein the commodity information is matched with the plurality of pieces of multimedia content in each search result according to the following steps:

parsing each piece of multimedia content to determine a commodity respectively associated with each piece of multimedia content; and according to the determined commodity respectively associated with each piece of multimedia content and the commodity respectively corresponding to each piece of commodity information, matching the commodity information with the pieces of multimedia content that correspond to the same commodity.

15. A non-transitory computer-readable storage medium, wherein a computer program is stored on the computer-readable storage medium, and the computer program, when executed by a computer device, causes the computer device to:

receive search information with a commodity description field being marked;

acquire a plurality of search results matching the commodity description field, wherein each search result comprises commodity information and a plurality of pieces of multimedia content matching a commodity indicated by the commodity information, wherein matching each of the plurality of pieces of multimedia content with the commodity comprises:

extracting commodity link information from the piece of multimedia content, and determining, based on the commodity link information, the commodity associated with the piece of multimedia content, acquiring comment content of the piece of multimedia content, and extracting, from the comment content, the commodity associated with the piece of multimedia content, performing semantic recognition on the piece of multimedia content, and determining, based on a semantic recognition result, the commodity associated with the piece of multimedia content, and initiating a commodity search request by using a key frame in the piece of multimedia content as search information, and identifying a commodity indicated by an obtained search result as the commodity associated with the piece of multimedia content; and present the search results in different regions in a search result page.

16. The non-transitory computer-readable storage medium according to claim 15, wherein the computer device being caused to present the search results in different regions in the search result page comprises being caused to:

divide a search result presentation region of the search result page into a first sub-region and a second sub-region, present the commodity information in the first sub-region, and present the plurality of pieces of multimedia content in the second sub-region.

17. The non-transitory computer-readable storage medium according to claim 16, wherein the computer device being caused to present the search results in different regions in the search result page comprises being caused to:
- in response to a first trigger operation acting on the first sub-region, present a purchase page corresponding to the commodity information; or
- in response to a second trigger operation acting on any piece of multimedia content in the second sub-region, perform full-screen playback on each piece of multimedia content in the second sub-region sequentially from the any piece of multimedia content.

18. The non-transitory computer-readable storage medium according to claim 16, wherein the computer device being caused to present the plurality of pieces of multimedia content in the second sub-region comprises being caused to:
- present, in the second sub-region, the multimedia content describing the commodity in at least one description dimension, wherein the description dimension is determined based on a commodity type, and each description dimension corresponds to at least one piece of the multimedia content.

* * * * *